United States Patent Office 3,483,241
Patented Dec. 9, 1969

3,483,241
ORGANOSULFONYLALKYLSILANES AND METHODS FOR MAKING THEM
Abe Berger, Schenectady, N.Y., assignor to General Electric Company, a corporation of New York
No Drawing. Filed Dec. 20, 1967, Ser. No. 691,971
Int. Cl. C07f 7/12, 7/18; C08f 11/04
U.S. Cl. 260—448.2
9 Claims

ABSTRACT OF THE DISCLOSURE

Organosulfonylalkylsilanes are provided having the formula, $$RSO_2R'SiR_aR''_{3-n}$$

where R is a monovalent hydrocarbon radical free of aliphatic unsaturation, R' is a $$-CH_2CH(CH_2)_b-$$
$$\phantom{-CH_2CH(}|\phantom{CH_2)_b-}$$
$$\phantom{-CH_2CH(}R'''$$

radical, R" is selected from an alkoxy radical and a halogen radical, R''' is selected from hydrogen and an alkyl radical having from 1 to 8 carbon atoms, $a$ is a whole number equal to 0 to 2, inclusive, and $b$ is an integer equal to 1 to 5, inclusive. There also is provided methods for making these organosulfonylalkylsilanes which can be employed to make organopolysiloxane elastomers exhibiting reduced swell when in contact with an organic solvent for an extended period of time.

---

The present invention relates to certain organosulfonylalkylsilanes and to methods for making them.

The organosulfonylalkylsilanes of the present invention, hereinafter referred to as either "alkoxysilylsulfones," or "halosilylsulfones," are included by the formula, (1) $\qquad RSO_2R'SiR_aR''_{3-n}$ where R is a monovalent hydrocarbon radical free of aliphatic unsaturation, R' is a $$-CH_2CH(CH_2)_b-$$
$$\phantom{-CH_2CH(}|\phantom{CH_2)_b-}$$
$$\phantom{-CH_2CH(}R'''$$

radical, R" is a member selected from an alkoxy radical and a halogen radical, R''' is selected from hydrogen and an alkyl radical having from 1 to 8 carbon atoms, $a$ is a whole number equal to 0 to 2, inclusive, and $b$ is an integer equal to 1 to 5, inclusive.

Radicals included by R of Formula 1 are, for example, aryl radicals such as phenyl, tolyl, xylyl, naphthyl, etc.; alkyl radicals such as methyl, ethyl, propyl, butyl, pentyl, hexyl, octyl, etc.; cycloalkyl radicals such as cyclopentyl, cyclohexyl. Radicals included by R' are, for example, trimethylene, tetramethylene, pentamethylene, hexamethylene, etc.; branched radicals such as $$-CH_2CHCH_2-$$
$$\phantom{-CH_2}|\phantom{CHCH_2-}$$
$$\phantom{-CH_2}CH_3$$

$$-CH_2CHCH_2-$$
$$\phantom{-CH_2}|\phantom{CHCH_2-}$$
$$\phantom{-CH_2}CH_3$$

etc. Radicals included by R" are, for example, halogen radicals such as chloro, bromo, iodo and fluoro; alkoxy radicals such as methoxy, ethoxy, propoxy, isopropoxy, butoxy, tert-butoxy, etc. In Formula 1, where R and R" respectively can represent more than one radical, these radicals can be the same, or a mixture of any two of the aforementioned radicals.

The alkoxysilylsulfones included by Formula 1 are, for example, trimethoxysilylpropylphenylsulfone, 2-methyl-3-(methyldimethoxysilyl)propylmethylsulfone, triethoxysilylpropylmethylsulfone, 2-ethyl-3-(triethoxysilyl)propylmethylsulfone, etc. The halosilylsulfones included by Formula 1 are, for example, methyldichlorosilylpropylphenylsulfone, 2-methyl-3-(dichloromethylsilyl)propylmethylsulfone, trichlorosilylpropylmethylsulfone, dichloromethylsilylpropylmethylsulfone, etc.

The alkoxysilylsulfones of the present invention can be employed as glass sizers, metal protectants, polar solvents, intermediates for making solvent resistant organopolysiloxane elastomers, etc. The halosilylsulfones of the present invention can be employed as intermediates for making solvent resistant organopolysiloxane elastomers, resins, polar organopolysiloxane fluids, etc.

The method for making the alkoxysilylsulfones included by Formula 1, in accordance with the practice of the present invention, hereinafter referred to as the "alkalisulfinate" method, involves contact between an alkali metal sulfinate and an alkoxysilylalkylhalide in the presence of a tertiary amide solvent, as shown by the following equation, $$RSO_2M + XR'SiR_a(OR''')_{3-n} \rightarrow RSO_2R'SiR_a(OR''')_{3-a}$$

where M is an alkali metal ion, and X is a halogen radical, as defined for R" above. In instances where it is desired to make halosilylsulfones having halogen radicals instead of alkoxy radicals attached to silicon, the "hydrosilylation" method can be used involving contact between an aliphatically unsatuarted organosulfone and a halosilane in the presence of a hydrosilylation catalyst, as shown by the following equation, $$RSO_2Q + HSiR_a(X)_{3-n} \rightarrow RSO_2R'SiR_aX_{3-a}$$

where Q is an aliphatically unsaturated monovalent hydrocarbon radical.

In accordance with the present invention, there is provided a method for making alkoxysilylsulfones included by Formula 1, which comprises:

(1) contacting at a temperature in the range between 50° C. to 150° C., (A) an alkali metal sulfinate of the formula, (2) $\qquad MSO_2R$ and (B) a haloalkylalkoxysilane of the formula, (3) $\qquad XR'SiR_a(OR''')_{3-n}$ in the presence of a tertiary amide solvent, and (2) recovering said alkoxysilylsulfone from the mixture of (1), where the various terms are as previously defined.

The hydrosilylation method for making halosilylsulfones of Formula 1, comprises (1) effecting contact at a temperature in the range of between 10° C. to 150° C., between a silicon hydride of the formula, (4) $\qquad (X)_{3-a}R_aSiH$ and an aliphatically unsaturated sulfone of the formula, (5) $\qquad QSO_2R$ in the presence of an effective amount of a platinum catalyst, and (2) recovering from the resulting mixture of (1), a halosilylsulfone, where R, X, and $a$, are as previously defined, and Q is a $$CH_2=C(CH_2)_{b-2}$$
$$\phantom{CH_2=C(}|\phantom{CH_2)_{b-2}}$$
$$\phantom{CH_2=C(}R'''$$

radical, where $b$ and R''' are as previously defined.

One method for making the aliphatically unsaturated sulfones of Formula 5, is by contacting an alkali metal sulfinate of Formula 2, and an aliphatically unsaturated hydrocarbon halide, such as $$CH_2=CCH_2X$$
$$\phantom{CH_2=}|\phantom{CCH_2X}$$
$$\phantom{CH_2=}R'''$$

in the presence of a tertiary amide solvent. For example, the production of a branched aliphatically unsaturated sulfone can be illustrated as follows,

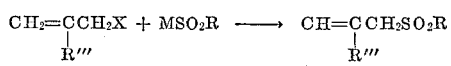

These are included by the alkali meal sulfinates of Formula 2, for example, sodium methanesulfinate, sodium benzenesulfinate, potassium ethanesulfinate, potassium p-tolylsulfinate, etc.

Included by the haloalkylalkoxysilanes of Formula 3, are silanes such as chloropropyltrimethoxysilane, bromopropyltriethoxysilane, chlorobutyldimethylmethoxysilane, bromopropyldimethylpropoxysilane, iodopropyltriethoxysilane, etc.

Among the silicon hydrides of Formula 4 there are included, trichlorosilane, methyldichlorosilane, phenyldichlorosilane, dimethylchlorosilane, etc.

There are included among the aliphatically unsaturated sulfones of Formula 5, allylmethylsulfone, allylphenylsulfone, β-methallylmethylsulfone, β-methallylphenylsulfone, tolylalkylsulfone, 3-butenylmethylsulfone, etc.

When making the alkoxysilylsulfones in accordance with the alkali metal sulfinate method of the present invention, contact is effected between the alkali metal sulfinate and the haloalkylalkoxysilane in the presence of a tertiary amide solvent at an elevated temperature. Reaction salts can thereafter be removed. The mixture is then fractionally distilled to provide for the separation of the alkoxysilylsulfone.

Preferably, the haloalkylalkoxysilane is added to a mixture of the alkali metal sulfinate and the tertiary amide solvent while the mixture is at a temperature in the range between 90° C. to 140° C. Suitable tertiary amide solvents that can be employed in the practice of the invention, are for example, dimethylformamide, dimethylacetamide, N-methyl-pyrolidone, diethylacetamide, etc. Substantially equal molar amounts of the alkali metal sulfinate and the haloalkylalkoxysilane have been found to provide for optimum results. Sufficient tertiary amide solvent should be employed to at least partially dissolve the alkali metal sulfinate at the temperature utilized for the sulfination reaction. Separation of metal salts can be readily achieved by standard techniques such as centrifuging, filtration, etc. Recovery of the alkoxysilylsulfone product can be accomplished by standard methods such as fractional distillation of the reaction mixture.

The hydrosilylation method to produce the halosilylsulfone can be achieved by effecting addition between the aliphatically unsaturated organosulfone and the silicon hydride by use of a suitable hydrosilation catalyst, such as a platinum complex or platinum salt. Recovery of the resulting halosilylsulfone can be achieved by fractional distillation of the resulting reaction mixture.

Preferably, the siliconhydride is added to the mixture of the aliphatically unsaturated organosulfone and the platinum catalyst, while the mixture is maintained under an inert atmosphere, such as a dry nitrogen atmosphere. A temperature in the range of between 10° C. to 150° C. has been found to provide for effective results, and preferably between 60° C. to 100° C. Suitable platinum catalysts that can be employed are shown by Lamoreaux Patent 3,220,972 and Ashby Patent 3,159,662, both assigned to the same assignee as the present invention. For example, a reaction product of chloroplatinic acid and butanol can be employed, or a platinum-olefin complex, such as a platinum-ethylene complex. An effective amount of platinum catalyst, is an amount which is sufficient to provide from about .01 to about 400 parts of platinum, per million parts of reaction mixture. Recovery of the halosilylsulfone can be achieved by standard methods, such as fractional distillation of the reaction mixture.

In order that those skilled in the art will be better able to practice the invention, the following are given by way of illustration and not by way of limitation. All parts are by weight.

EXAMPLE 1

There was added 19.8 parts of chloropropyltrimethoxysilane to a mixture of 19.6 parts of sodium benzene sulfinate, and about 150 parts of dimethylformamide at a temperature of 100° C. The reaction mixture became cloudy after the addition was completed, during which time the mixture was constantly agitated. After complete addition, the mixture was maintained with stirring at a temperature of 100° C. for an additional 3 hours. The mixture was then filtered and fractionally distilled. There was obtained a 75% yield of product having a boiling point of 175° C. at 2 mm. Based on its method of preparation and elemental analysis, the product was trimethoxysilylpropylphenylsulfone having the formula, $$C_6H_5SO_2CH_2CH_2CH_2Si(OCH_3)_3$$

Elemental analysis (wt. percent) for $C_{12}H_{20}SSiO_5$ showed: Theory; C, 47.7; H, 6.58; S, 10.53; Si, 9.21. Found; C, 47.18; H, 6.58; S, 10.61; Si, 9.46.

EXAMPLE 2

There was added 57.5 parts of methyldichlorosilane to a mixture of 91 parts of allylphenylsulfone and 53 parts of platinum, per million of mixture, in the form of a platinum complex taught in Lamoreaux Patent 3,220,972, at a temperature of 60° C. The temperature rose to 110° C., and was maintained at 100° C.–120° C. by the rate of addition of the methyldichlorosilane. After the addition was completed, the mixture was heated for an additional 4 to 5 hours at a temperature of 115° C. The mixture was then allowed to cool. Fractional distillation of the mixture resulted in a 65% yield of product boiling at 165° C. to 167° C. at 0.5 mm. Based on method of preparation, and its infra-red spectrum the product was methyldichlorosilylpropylphenylsulfone having the formula, $$C_6H_5SO_2CH_2CH_2CH_2SiCH_3(Cl)_2$$

EXAMPLE 3

There was added 23 parts of methyldichlorosilane to a mixture under an inert atmosphere at 60° C. consisting of 26.8 parts of methylallylsulfone and 25 parts of platinum, per million parts of mixture utilizing the platinum catalyst of Example 2. During the addition, the temperature was maintained at 70° C. to 110° C. After the addition, the mixture was heated for two hours at 110° C. and then fractionally distilled. A product was obtained at about a 75% yield having a boiling point of 154° C. to 156° C. at 2 mm. Based on the method of preparation, the product was 2-methyl-3-(di-chloromethylsilyl)propylmethylsulfone having the formula,

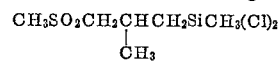

EXAMPLE 4

There was added 60 parts of trichlorosilane to a mixture under an inert atmosphere of 53 parts methylallylsulfone, and 75 parts of platinum per million parts of mixture utilizing a platinum-ethylene complex. The temperature of the mixture rose rapidly to 120° C. After the addition, the mixture was held at 110° C. for 2 additional hours by using external heat. The mixture was then fractionally distilled. A product was recovered at a yield of 85% having a boiling point of 117° C. at 13 mm. Based on method of preparation and its infrared spectrum, the product was trichlorosilylpropylmethylsulfone of the formula.

$$CH_3SO_2CH_2CH_2CH_2SiCl_3$$

EXAMPLE 5

There was gradually added 115 parts of methyldichlorosilane to a mixture at 80° C. of 120 parts of methylallylsulfone and 169 parts of platinum per million parts of mixture utilizing chloroplatinic acid. During the addition, the temperature rose to 115° C. After addition, the temperature of the mixture was maintained for 3 additional hours at 115° C. by use of external heat. The mixture was then fractionally distilled. There was obtained a 70% yield of product having a boiling point of 142°–144° C. at 0.1 mm. Based on method of preparation and its infrared spectrum, the product was methyldichlorosilylpropylmethylsulfone of the formula, $$CH_3SO_2CH_2CH_2CH_2SiCH_3(Cl)_2$$

While the foregoing examples have been limited to only a few of the very many variables within the scope of the present invention, it should be understood that the present invention is directed to a much broader class of organosulfonylalkylsilanes of Formula 1 in the form of either alkoxysilylsulfones or halosilylsulfones. In addition, these organosulfonylalkylsilanes can be made by either the alkali sulfinate method, or the hydrosilylation method utilizing conditions which are much broader than those shown in the foregoing examples as illustrated in the above description of these methods prior to the foregoing examples.

What I claim as new and desire to secure by Letters Patent of the United States is:

1. Organosulfonylalkylsilanes having the formula, $$RSO_2R'SiR_aR''_{3-a}$$

where R is a monovalent hydrocarbon radical free of aliphatic unsaturation, R' is a $$-CH_2CH(CH_2)_b-\underset{R'''}{|}$$

radical, R'' is a member selected from an alkoxy radical and a halogen radical, R''' is selected from hydrogen and an alkyl radical having from 1 to 8 carbon atoms, $a$ is a whole number equal to 0 to 2, inclusive, and $b$ is an integer equal to 1 to 5, inclusive.

2. An alkoxysilylsulfone, in accordance with claim 1, of the formula, $$RSO_2R'SiR_a(OR''')_{3-a}$$

3. A halosilylsulfone, in accordance with claim 1, of the formula, $$RSO_2R'SiR_aX_{3-a}$$

where X is a halogen radical.

4. An alkoxysilylsulfone, in accordance with claim 2, of the formula, $$C_6H_5SO_2CH_2CH_2CH_2Si(OCH_3)_3$$

5. A halosilylsulfone, in accordance with claim 3, of the formula, $$C_6H_5SO_2CH_2CH_2CH_2SiCH_3(Cl)_2$$

6. A halosilylsulfone, in accordance with claim 3, of the formula, $$CH_3SO_2CH_2CHCH_2SiCH_3(Cl)_2$$
$$\phantom{CH_3SO_2CH_2C}|\phantom{CH_2SiCH_3(Cl)_2}$$
$$\phantom{CH_3SO_2CH_2CH}CH_3$$

7. A halosilylsulfone, in accordance with claim 3, of the formula, $$CH_3SO_2CH_2CH_2CH_2SiCl_3$$

8. A halosilylsulfone, in accordance with claim 3, of the formula, $$CH_3SO_2\ CH_2CH_2CH_2SiCH_3(Cl)_2$$

9. A method for making the alkoxysilylsulfones of claim 2, which comprises (1) contacting at a temperature between 50° C. to 150° C., (A) an alkali metal sulfinate of the formula, $$MSO_2R$$

and (B) a haloalkylalkoxysilane of the formula, $$XR'SiR_a(OR''')_{3-a}$$

in the presence of a tertiary amide solvent, and (2) recovering said alkoxysilylsulfone from the mixture of (1), where R, R', R''' and $a$ are as defined in claim 1 and M is an alkali metal ion.

References Cited

UNITED STATES PATENTS

| | | | |
|---|---|---|---|
| 2,960,492 | 11/1960 | Morton et al. | 260—448.2 XR |
| 2,970,150 | 1/1961 | Bailey | 260—448.2 XR |
| 2,997,457 | 8/1961 | Kantor | 260—448.2 XR |
| 3,078,292 | 2/1963 | Prober | 260—448.2 |

TOBIAS E. LEVOW, Primary Examiner

P. F. SHAVER, Assistant Examiner

U.S. Cl. X.R.

106—14; 117—135.1; 260—46.5, 448.8